March 26, 1935.    R. SARAZIN    1,995,584
ELECTRODE FOR ARC WELDING
Filed Feb. 23, 1934
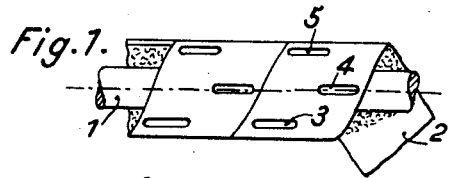 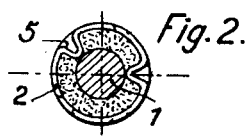
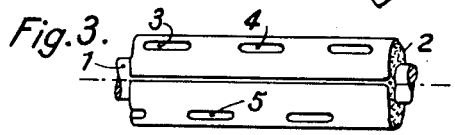 
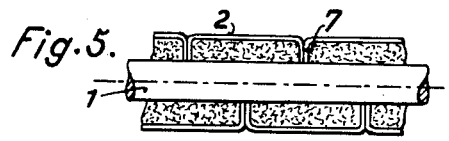 
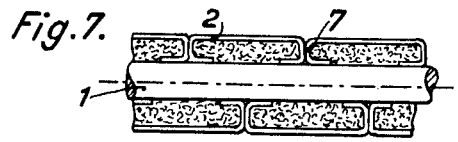 
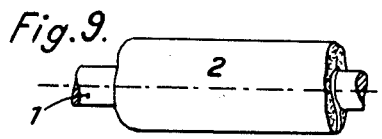 
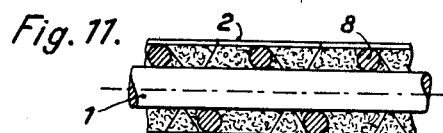 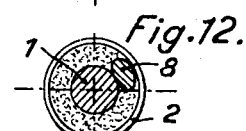
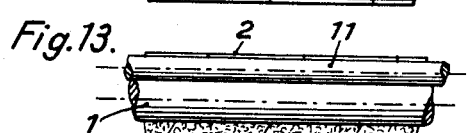 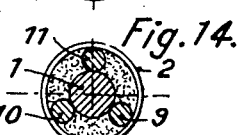
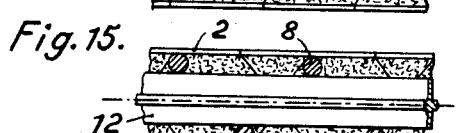 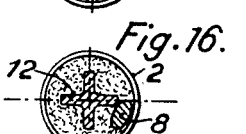
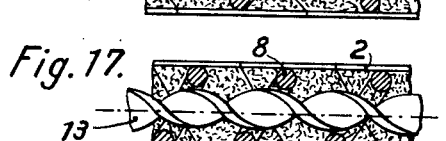 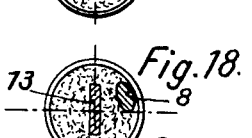
R. Sarazin
INVENTOR
By: Marks & Clerk
Attys.

Patented Mar. 26, 1935

1,995,584

UNITED STATES PATENT OFFICE 1,995,584

ELECTRODE FOR ARC WELDING

Robert Sarazin, Neuilly-sur-Seine, France

Application February 23, 1934, Serial No. 712,639
In France February 25, 1933

8 Claims. (Cl. 219—8)

The problem of electric arc welding involves the use of electrodes which are generally supplied to the industry in the form of wires, rods or reels.

When the process was first introduced, a bare wire was employed and this wire is now employed less and less.

The continuous electrode for automatic welding is drawn along by milled rollers which push it towards the work-piece through a guide tube. The guide tube is provided with current through a brush contact.

It is obviously of interest that the supply of current should be effected on the continuous electrode as near as possible to the arc because in this way the current density in the latter can be greatly increased without bringing it to red heat and injuring it. The wire which is pushed continuously towards the arc is renewed at each moment and it cannot become heated to any great extent before melting.

A bare wire is the most easy to employ on an automatic machine because the fluted wheels exert a perfect drawing action on it and further a simple copper sliding contact is sufficient for supplying current to the desired point.

Unfortunately, it is now universally recognized that a bare wire provides a weld which has low mechanical properties. In particular the extension and resilience of the metal deposited are negligible.

It is also known that it is possible to effect welds of high quality if the wire forming the electrode is covered with a sufficiently thick coating containing metallic alloys and suitable deoxidizing agents.

However, in the case of a continuous electrode the problem is different. It is also necessary to supply the current to the central core, as otherwise the operator will observe interruptions in the arc and a great instability in the fusion of the metal.

Various solutions have been hitherto proposed which have not given complete satisfaction. It has been proposed for example to surround the wire with a casing formed by a leaf wound in the longitudinal direction and enveloping the wire. The coating is placed between the casing and the wire but a sufficient amount of this coating cannot be provided without producing a complete electrical insulation between the wire and the casing; and it is the latter which receives the current and must transmit it to the central wire.

It is known that pulverulent coatings are always bad conductors. The use of such coatings therefore makes it necessary to use thin covering layers and the mechanical properties of the welds are not perfect. This wire cannot for example be used for important work such as for welding boilers.

Those acquainted with the art know that remarkable results can be obtained by hand welding on account of the thick coatings which can be provided on the electrode. Some have proposed to wind a close pitch spiral upon the wire and include the coating between the threads, the supply of current and also the movement of the electrode thus combined being effected through the outer surface of the threads.

The results obtained have not been such as to enable this idea to be commercialized because the agglomerated coating is broken and detached by its passage through the milled rollers and in order to obtain a uniform feed the turns of wire wound helically around the main wire must be placed sufficiently close together. The close spacing of the turns of wire and the increased number of these turns leads to a reduction in the ratio of the volume of coating with respect to the volume of metal melted; these volumes for a given length have known ratios and for example certain qualities of electrodes require two to three times more coating than metal in order to obtain the desired mechanical characteristics or melting properties.

The two coating systems described above have only been indicated by way of example and in order to show clearly that a perfect continuous electrode must solve numerous problems.

The present invention provides a simple means for obtaining this result.

It is based on the fact that a wedge having thickness is placed between a central wire and an outer casing, this wedge having the double function of providing a uniform space between the wire and an outer casing for holding a determined quantity of coating materials and also for transmitting the current from the casing to the central wire.

It will be seen that if the interposed element which has to form a wedge is suitably chosen and arranged, it will provide a guarantee that the coating will be uniformly distributed in a perfect manner along the central wire, whatever be the thickness which depends only upon the thickness of the interposed element itself.

It will be preferable for the interposed element placed between the casing and the wire to be sufficiently rigid so that it will not yield too much under the pressure of the feeding wheels and will avoid too great a deformation of the electrode at the moment it is fed along. For this purpose it will be of advantage for the casing to be jointed or for the member forming it to be arranged with contacting edges by winding it in a helix or arranging it in a straight line along a generating line.

Various embodiments which are given by way of example will make the unity of the invention clearly understood.

In the accompanying drawing:

Fig. 1 is a fragmentary side elevation of an electrode constructed in accordance with the invention.

Fig. 2 is a transverse sectional view through the electrode.

Figs. 3 and 4 are similar views of a second form of the invention.

Figs. 5 and 7 are fragmentary longitudinal sectional views of further modifications of the invention.

Figs. 6 and 8 are transverse sectional views of Figs. 5 and 7, respectively.

Fig. 9 is a fragmentary elevation of a further modification, and Fig. 10 a transverse section thereof.

Figs. 11, 13, 15 and 17 are fragmentary longitudinal sectional views of four further embodiments of the invention.

Figs. 12, 14, 16 and 18 are transverse sectional views of the forms illustrated in Figs. 11, 13, 15 and 17, respectively.

Referring to the drawing in detail and more particularly to Figs. 1 and 2, the central wire 1 is surrounded by a strip for example of mild steel 2 which carries a series of small projections 3, 4, 5 previously formed by pressing or stamping.

The leaf or strip is wound spirally and the projections vary in number according to requirements. Their height is determined by the thickness of coating which it is desired to feed to the centre of the arc in order to obtain the desired result. The coating is represented in the sectional view as being of a granular nature.

Figures 3 and 4 illustrate a similar embodiment in which the strip 2 is arranged longitudinally and concentrically with the bare wire core 1. The projections 3, 4, 5, etc. establish contact between the casing and the wire and lead the current to the latter element.

Figures 5 and 6 illustrate in longitudinal section and cross section various forms of the invention. The element interposed between the bare wire core 1 and the outer casing 2 is formed by a right angle bend 7 provided upon each edge of the outer strip. The coating is placed in position when winding the U-shaped member thus formed or previously placed in the steel ribbon, the latter being then wound on the wire.

Figures 7 and 8 illustrate a modification of the arrangement shown in Figure 5. The strip containing the coating is a ribbon bent over at 7 as indicated in the figures. The coating is completely enclosed within a casing and the hollow ribbon thus formed may be placed upon the wire 1 either by helical winding or by a longitudinal mounting which closes the ribbon upon the wire.

Figures 9 and 10 are developed from the arrangement shown in Figure 8. The wire 1 is shown surrounded by a longitudinal casing 2, while two bends 7 and 7ᵃ in the material of the casing permit a second casing 8 to be formed which ensures a perfect electrical contact. The leaf or strip is thus bent at 7 symmetrically upon itself, for example about the vertical axis as illustrated in Figure 10 and is bent down to enclose the coating around the wire. The small flanges 7 and 7ᵃ form the wedge and space the casing 2 from the wire 1. The thickness of the coating is thus regulated as a consequence.

Figures 11 and 12 illustrate a wire 1 and a casing 2. Between these two elements is placed a wire 8 wound in a long spiral around the wire 1. The wire 8 serves simply as the interposed element for maintaining the desired spacing between the wire 1 and the casing 2. Any pitch may be adopted but in view of its purpose and contrary to previous practice, it is of advantage to mount it in the form of a spiral having a long pitch.

The casing 2, on the other hand, must be arranged in the form of a helix having contacting or approximately contacting edges so as to enclose the coating products.

In the case of a continuous electrode intended for automatic welding, the casing 2 on the one hand and the auxiliary wire 8 on the other hand should preferably be made of mild steel because they must lead the current from the casing to the core 1; but in the case of a hand electrode this requirement is not absolute because the current only enters at the end of the rod 1 which is always held in the welder's electrode holder.

When the electrode is to be employed for hand operation, the wire 1 may for example be formed of a suitable metal as is laid down; the casing 2 will preferably be of paper and the wire 8 forming the intermediate wedge will be formed either by a twist of paper, a textile thread, a string, an asbestos yarn, etc.

Figures 13 and 14 illustrate an embodiment which is dependent upon Figure 11. In these figures the wire 8 is replaced by a plurality of longitudinal wires 9, 10, 11, etc.

Figures 15 and 16 illustrate a modification in which the central wire 1 instead of being circular has a cruciform section such as 12. The wire 8 is wound helically around the wire 12 and the casing 2 is then placed upon the assembly as indicated above. This arrangement is of interest in the case of electrodes having a very thick coating. The cruciform section in fact permits an increase in the section of the coating of the electrode wire 2 for a given weight of metal.

For the same purpose in the case of the manufacture of electrodes having a thick coating according to the invention, the construction illustrated in Figures 17 and 18 may be adopted. The central wire is formed by a flat strip 13 twisted about its axis and covered with a steel wire 8 wound helically with a pitch of opposite hand to that of the flat strip. This wire in fact forms a wedge between the central core 13 and the casing 2.

All the embodiments described above have only been given in order to illustrate the invention which resides as stated above in the fact of interposing an element forming a wedge between a central core and an external casing.

In all cases the central core is metallic. When the electrode is to be employed for automatic welding, the outer casing is metallic and also the interposed element forming the wedge. On the other hand, in the case of hand welding, the outer casing simply performs the function of a covering medium and it may, together with the interposed element, be formed by conducting or non-conducting materials for instance by materials of organic origin such as paper, cotton, etc.

It should be noted that in this last case the use of organic elements is favorable because these materials which have a cellulose base liberate hydrogen at the moment of combustion and it is known that this reducing gas has a deoxidizing action.

The above description shows clearly that the embodiment of the invention is independent of the different forms of the elements and of the materials employed for their manufacture.

I claim:

1. An electrode for arc welding, comprising a central core, an outer casing, an intermediate wire between the central core and the casing, a coating placed between the core and the casing within the spaces left free by the intermediate wire.

2. An electrode for arc welding, comprising a central core, an outer casing, an intermediate wire wound in a helix about the central core under the casing, a coating placed between the core and the casing and within the spaces left free by the intermediate wire.

3. An electrode for arc welding, comprising a central core, an outer casing, an intermediate wire longitudinally arranged between the central core and the casing, a coating placed between the core and the casing within the spaces left free by the intermediate wire.

4. An electrode for arc welding, comprising a central core, a casing made of a ribbon wound with turns having contacting edges and wound about the central core, spacing means interposed between the core and the casing, a coating material placed between the core and the casing.

5. An electrode for arc welding, comprising a central core having a cruciform cross section, an outer casing, an intermediate core between the central core and the casing, a coating material placed between the core and the casing.

6. An electrode for arc welding, comprising a central core constituted by a flat strip twisted about its axis, an outer casing, an intermediate core between the central core and the casing, a coating material placed between the core and the casing.

7. An electrode for arc welding, comprising a central core having a cruciform cross section, an outer casing, an intermediate wire wound in a helix about the central core and under the casing, a coating material placed between the core and the casing.

8. An electrode for arc welding, comprising a central core, constituted by a flat strip twisted on its axis, an outer casing, an intermediate wire wound in a helix about the central core and under the casing, and a coating material placed between the central core and the casing.

ROBERT SARAZIN.